April 30, 1929.   A. E. ANDERSON   1,711,106
AUTOMATIC RECLOSING CIRCUIT BREAKER SYSTEM
Filed Aug. 11, 1926
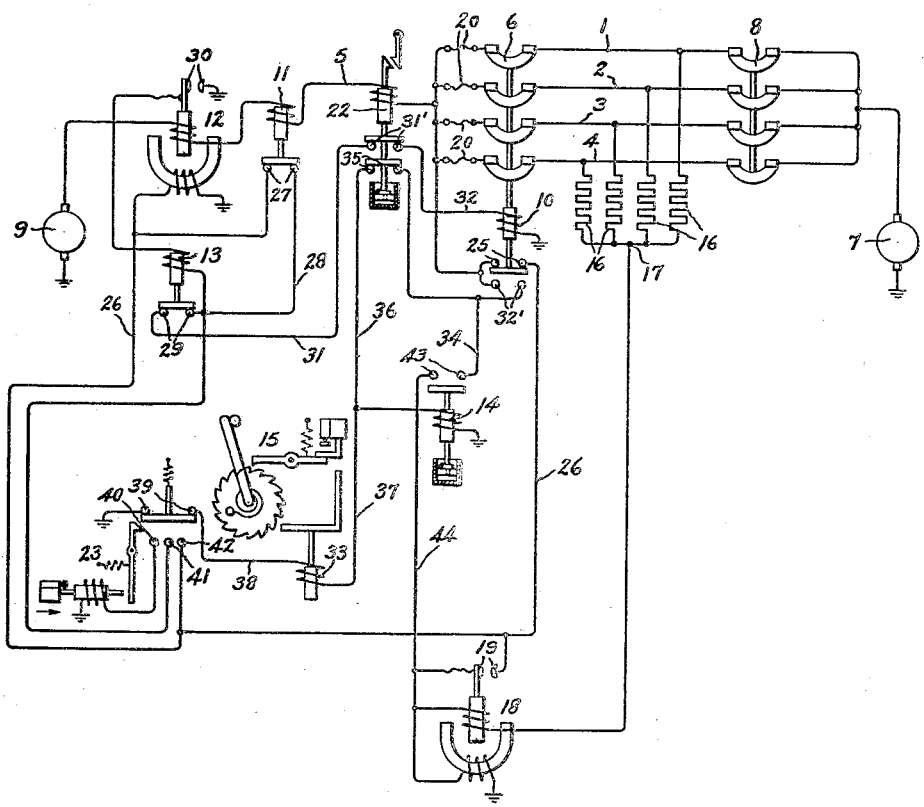
Inventor:
Arvid E. Anderson,
by
His Attorney.

Patented Apr. 30, 1929.

1,711,106

UNITED STATES PATENT OFFICE.

ARVID E. ANDERSON, OF SCOTIA, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed August 11, 1926. Serial No. 128,670.

My invention relates to automatic reclosing circuit breaker systems, and particularly to a system for controlling the connection between a plurality of load circuits, such as feeders of a trolley system, and a common bus or supply circuit.

One object of my invention is to provide an improved arrangement for controlling the connections between a common supply circuit and a plurality of load circuits whereby, upon the occurance of a fault on any one of the load circuits, the faulty circuit is disconnected from and reconnected to the supply circuit a predetermined number of times and then is permanently disconnected from the supply circuit if the faulty condition still exists after the faulty circuit has been reconnected to supply circuit a predetermined number of times.

My invention will be better understood from the following description, taken in connection with the accompanying drawing, which discloses diagrammatically an automatic reclosing circuit breaker system embodying my invention, and its scope will be pointed out in the appended claims.

Referring to the accompanying drawing, 1, 2, 3, and 4 represent a plurality of separate load circuits which are adapted to be connected to a supply circuit or bus 5 by suitable switching means 6, shown in the drawing as a multipole circuit breaker. The circuit breaker 6 when closed connects corresponding conductors of the load circuit 1 to 4 inclusive in parallel and to the supply circuit 5. The circuits 1, 2, 3, and 4 are also shown as being supplied at another point by a source 7 which is connected to the load circuits by means of a suitable switching means 8, which is also shown as a multipole circuit breaker.

In order to simplify the drawing, the supply and load circuits have been shown as having the ground as a common side thereof, but it is evident that my invention is not limited to a grounded system, but is equally applicable to a system in which ungrounded metallic conductors are used for both sides thereof.

The supply circuit 5 is arranged to be supplied by a source of current 9, which may be of any suitable type.

The circuit breaker 6 may be of any suitable type, examples of which are well known in the art. As shown, it is of the well known contactor type having a coil 10 which, when energized, closes and maintains the circuit breaker closed.

In order to effect the opening of the circuit breaker 6 upon the occurrence of a fault on any one of the load circuits, an overload relay 11 is provided in the supply circuit. This relay operates substantially instantaneously, whenever the current in the supply circuit exceeds a predetermined value, to effect the opening of the circuit breaker. A reverse current relay 12, which may be of any suitable type, is also provided in the supply circuit and is arranged to effect the opening of the circuit breaker 6 whenever current flows through the supply circuit from the load circuits. The purpose of the reverse power relay 11 is to prevent the source 9 from receiving energy from, instead of delivering energy to, the load circuits. 13 is a control relay associated with the reverse power relay 12.

For effecting the automatic reclosing of the circuit breaker 6 after it has been opened, a time relay 14, which may be of any suitable construction, is provided. This relay is arranged to permit the closing of the circuit of the closing coil 10 after the circuit breaker has been open a certain length of time. 15 is a notching relay which is arranged to be operated each time the circuit breaker 6 is opened. The relay 15 removes the control of the closing coil 10 from the overload relay 11 after the breaker has been reclosed a predetermined number of times, so that it remains closed irrespectively of the subsequent operation of the overload relay.

In case the load circuits are arranged as shown, so that they are supplied at other points, it would not be desirable to reclose the circuit breaker 6 under conditions which would result in reverse current flowing through the supply circuit 5 to the source 9. Therefore, I provide an arrangement whereby the reclosing of the circuit breaker 6 is controlled in accordance with the average voltage across the load circuit and its relation with respect to the voltage across the supply circuit. It will be evident that current will flow from the source 9 to the load circuits after the circuit breaker 6 is closed only when the voltage of the supply circuit 5 at the time the circuit breaker is closed is greater than the average of the voltages across the load circuits.

For obtaining the average of the voltages across the load circuits in the arrangement shown in the drawing, the ungrounded sides of the load circuits are connected together with a current limiting means 16 having relatively high impedance connected between the common connection and the ungrounded side of each load circuit. The current limiting means 16 are shown as resistors, and have relatively high resistances so that very little current flows from one circuit to the other when a difference in voltage exists between two load circuits. The voltage between the common connection 17 of the resistors 16 and the common side of the load circuits which, in the system shown in the drawing, is the ground, is the average of the voltage across all of the load circuits.

A power directional relay 18, which may be of any suitable type, examples of which are well known in the art, is arranged to be connected between the supply circuit and the common connection 17 of the resistors 16 by the time relay 14 after the circuit breaker has been open a certain length of time. The relay 18 is arranged to close its contacts 19 and thereby effect the closing of the circuit of the closing coil 10 of the circuit breaker 6 when current flows from the supply circuit to the resistor 16, which indicates that the voltage of the supply circuit is greater than the average of the voltages of the load circuits.

In order to disconnect a faulty load circuit from the supply circuit after the breaker 6 has been opened and closed a predetermined number of times, so that the notching relay 15 has removed the control of the closing coil from the instantaneous overload relay 11 and the circuit breaker remains closed, a suitable time delayed circuit opening device 20, examples of which are well-known in the art, is provided in each load circuit. As shown, these devices are fuses. So long as the overload relay 11 is operative to effect the opening of the circuit breaker 6, the circuit breaker opens so quickly after the overload occurs that the fuse in the faulty load circuit does not have time to operate. When, however, the control of the circuit breaker is taken away from overload relay 11 so that the circuit breaker 6 remains closed, the fuse in the faulty circuit has time to blow due to the sustained overcurrent flowing through it and thereby disconnect the faulty circuit from the supply circuit.

In order to protect the generator 9 in case the fuse in the faulty circuit, for some reason, does not blow, a time delayed overload relay 22 is provided in the supply circuit and is arranged to effect the opening of the circuit breaker 6. Preferably, the relay 22 is arranged in any suitable manner so that it is locked in its energized position, and has to be reset manually before the circuit breaker can be reclosed again.

The notching relay 15 is provided with a reset magnet 23 which is arranged to reset the contacts thereof a predetermined time after they have been actuated so that the relay is again operative to permit the circuit breaker 6 to reclose the predetermined number of times before a fuse in a faulty circuit is blown.

The operation of the arrangement shown is as follows: When both of the circuit breakers 6 and 8 are closed and the load conditions are normal, the closing coil 10 of the circuit breaker 6 is completed from the ungrounded side of the supply circuit 5, through auxiliary contacts 25 on the circuit breaker 6, conductor 26, contacts 27 of the instantaneous overload relay 11, conductor 28, contacts 29 of control relay 13, which is deenergized because the contacts 30 of the reverse current relay 12 are open as long as the current does not flow from the load circuits to the source 9, conductor 31, contacts 31' of the overload relay 22, conductor 32, closing coil 10 to ground.

When the current through the supply circuit 5 exceeds a predetermined value, the instantaneous overload relay 11 opens its contacts 27 in the above-traced circuit of the closing coil 10 so that the circuit breaker 6 opens. Also, whenever the current reverses through the supply circuit so that the reverse power relay 12 closes its contacts 30 and connects the coil of the relay 13 between conductor 28, which is connected in the manner heretofore described to the ungrounded side of the supply circuit 5, and ground, the relay 13 opens its contacts 29 so that the circuit breaker 6 is opened.

The circuit breaker 6, in opening, disconnects the ungrounded side of each of the load circuits from the ungrounded side of the supply circuit 5. The circuit breaker 6, by closing its auxiliary contacts 32', completes the circuits for the time relay 14 and the actuating coil 33 of the notching relay 15. These circuits are from the ungrounded side of the supply circuit 5, through auxiliary contacts 32' on the circuit breaker 6, conductor 34, contacts 35 of the time delayed overload relay 22, conductor 36 and then one branch is through coil of time relay 14 to ground, and another branch 37 is through coil 33 of the notching relay 15, conductor 38, contacts 39 of the notching relay to ground.

The notching relay 15, as shown, is a type well known in the art which opens its contacts 39 and connects its contacts 40, 41 and 42 together when its actuating coil 33 has been energized a predetermined number of times with less than a predetermined time between the deenergization and the successive energization of the actuating coil 33. If more than a predetermined time elapses between the deenergization of the coil 33 and its successive energization, the notching relay is restored to its normal position.

When the heretofore described circuit is completed by the auxiliary contacts 32′ on the circuit breaker, the notching relay 15 notches up one notch, and a predetermined time afterward the time relay 14 closes its contacts 43, thereby connecting the power directional relay 18 between the supply circuit 5 and the common connection 17 of the resistors 16 through auxiliary contacts 32′ on the circuit breaker 6. When the supply circuit voltage exceeds the average of the voltages across the load circuit, current flows through the windings of the relay 18 in such a manner that the relay closes its contacts 19 and thereby completes the circuit of the closing coil 10 so that the circuit breaker 6 is reclosed. This circuit is from the ungrounded side of the supply circuit 5, through auxiliary contacts 32′ on the circuit breaker 6, conductor 34, contacts 43 of the relay 14, conductor 44, contacts 19 of the relay 18, conductor 26, contacts 27 of overload relay 11, conductor 28, contacts 29 of relay 13, conductor 31, contacts 31′ of relay 22, conductor 32, closing coil 10, to ground.

The opening of the auxiliary contacts 32′ on the circuit breaker opens the heretofore described circuits for the relay 14 and the actuating magnet 33 of the notching relay 15 so that these devices are immediately restored to their normal position. The opening of the contacts 32′ also opens the connection between the supply circuit through the power directional relay 18 to the resistors 16 so that the relay 18 opens its contacts 19.

If the opening of the circuit breaker was due to an overload condition on one of the load circuits and the abnormal condition still exists when the circuit breaker 6 is reclosed, the instantaneous overload relay 11 operates again and the above described cycle of operation is repeated and the notching relay 15 is moved up a notch each time the circuit breaker is opened.

After the circuit breaker has been opened a predetermined number of times, the notching relay opens its contacts 39, thereby opening the circuit of its actuating magnet 33 and connects its contacts 40, 41 and 42 together. The connecting of contacts 41 and 42 together completes a circuit around the contacts 27 of the instantaneous relay 11 so that the next time the circuit breaker 6 is reclosed and the overload relay 11 opens its contacts 27, the circuit of closing coil 10 is not broken. The circuit breaker 6, therefore, remains closed, and this allows the fuse 20 in the faulty load circuit to blow and disconnect the load circuit from the supply circuit.

The reset magnet 23, which is connected between conductor 26 and the ground when contacts 40 and 42 are connected together, operates after a time delay which is greater than the time it takes a fuse to blow to restore the contacts of the notching relay to their normal positions.

In case the fuse in the faulty load circuit fails to blow, the time delayed overload relay 22, whose minimum time of operation is greater than the time it normally takes any one of the fuses to blow, opens its contacts 35 in the circuits of the time relay 14 and the actuating magnet 33 of the notching relay 15, and opens its contacts 31′ in the circuit of the closing coil 10 so that the circuit breaker 6 is opened.

Since the overload relay 22 is arranged so that, after it has been energized, it is held in its energized position until it is reset manually, the operation of this relay prevents further operation of the reclosing equipment until the relay is reset by hand.

If the circuit breaker 6 remains closed for a certain length of time after any reclosure, the ratchet of the notching relay 15 is restored to its normal position.

While in a system of the type shown, in which the load circuits are adapted to be supplied at more than one point, it is desirable to provide an arrangement whereby the circuit breaker 6 cannot be reclosed in case the average of the voltages across the load circuits is greater than the supply voltage, it is evident that in a system in which the load circuits are stub end feeders, that is, feeders supplied with current at only one point, the power directional relay 18 may be omitted and the time relay 14 arranged to close the circuit of closing coil directly after the circuit breaker has been open a certain length of time.

While I have, in accordance with the patent statutes, shown and described my invention as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In an automatic reclosing circuit breaker system, a supply circuit, a plurality of load circuits, a circuit breaker for connecting said circuits together, reclosing means for effecting the automatic reclosing of said circuit breaker when said circuit breaker is open, overload responsive means for controlling the opening of said circuit breaker, means for rendering said overload responsive means inoperative to effect the opening of said circuit breaker after it has been reclosed a predetermined number of times, and time delayed overload responsive means associated with each load circuit for effecting the disconnection of the respective load circuit from said supply circuit.

2. In an automatic reclosing circuit breaker system, a supply circuit, a plurality of load circuits, a circuit breaker for connecting said circuits together, reclosing means for effecting the automatic reclosing of said circuit breaker when said circuit breaker is open, means responsive to the currents flowing between said supply circuit and said load circuits for controlling the opening of said circuit breaker, means for rendering said current responsive, means inoperative to effect the opening of said circuit breaker after it has been reclosed a predetermined number of times, and interrupting means associated with each load circuit responsive to a sustained overcurrent therein for effecting the disconnection of the respective load circuit from the supply circuit.

3. In an automatic reclosing circuit breaker system, a supply circuit, a plurality of load circuits, a circuit breaker for connecting said circuits together, reclosing means for effecting the automatic reclosing of said circuit breaker when said circuit breaker is open, means responsive to the currents flowing between said supply circuit and said load circuits for controlling the opening of said circuit breaker, means for rendering said current responsive means inoperative to effect the opening of said circuit breaker after it has been reclosed a predetermined number of times, and a fuse associated with each load circuit and arranged to be connected in series with said supply circuit and the respective load circuit when said circuit breaker is closed.

4. In an automatic reclosing circuit breaker system, two electric circuits, a circuit breaker for connecting said circuits together, means for effecting the opening of said circuit breaker, reclosing means for automatically reclosing said circuit breaker when said circuit breaker is open, and means controlled by the operation of the circuit breaker for maintaining said circuit breaker closed irrespectively of the operation of said first mentioned means after said circuit breaker has been operated a predetermined number of times.

5. In an automatic reclosing circuit breaker system, a supply circuit, a load circuit, a circuit breaker for connecting said circuits together, reclosing means for effecting the automatic reclosing of said circuit breaker when said circuit breaker is open, overload responsive means for effecting the opening of said circuit breaker, means for rendering said overload responsive means inoperative to effect the opening of said circuit breaker after it has been reclosed a predetermined number of times, and relatively slower acting overload responsive means associated with said load circuit for effecting the disconnection of said load circuit.

6. In an automatic reclosing circuit breaker system, two electric circuits, a circuit breaker for connecting said circuits together, reclosing means for automatically reclosing said circuit breaker when said circuit breaker is open, means responsive to the current flowing between said circuits when said circuit breaker is closed for controlling the opening of said circuit breaker, means controlled by the operation of the circuit breaker for maintaining said circuit breaker closed irrespectively of the operation of said current responsive means after said circuit breaker has been operated a predetermined number of times, relatively slower acting means responsive to the current flowing between said circuits when said circuit breaker is closed for effecting the disconnection of said circuits from each other, and additional means for effecting the opening of said circuit breaker if said relatively slower acting means fails to disconnect said circuits within a predetermined time.

7. In an automatic reclosing circuit breaker system, a supply circuit, a load circuit, a circuit breaker for connecting said circuits together, reclosing means for effecting the automatic reclosing of said circuit breaker when said circuit breaker is open, relatively quick acting overload responsive means for effecting the opening of said circuit breaker, means for rendering said overload responsive means inoperative to effect the opening of said circuit breaker after it has been reclosed a predetermined number of times, and a fuse in said load circuit arranged to interrupt said load circuit after said quick acting overload responsive means has been rendered inoperative to effect the opening of said circuit breaker.

8. In combination, a supply circuit, a plurality of separate load circuits, each load circuit being adapted to be supplied with current at a plurality of points, switching means for connecting corresponding conductors of said separate load circuits in parallel and to said supply circuit, and means controlled in accordance with the average of the voltages across said load circuits for controlling the operation of said switching means.

9. In an automatic reclosing circuit breaker system, a supply circuit, a plurality of separate load circuits, each load circuit being adapted to be supplied with current at a plurality of points, a circuit breaker for connecting corresponding conductors of said separate load circuits in parallel and to said supply circuit, means responsive to the current flowing between said supply and load circuits for effecting the opening of said circuit breaker, and means controlled in accordance with a predetermined relation between the supply circuit voltage and the average of the voltages across said load circuits for controlling the reclosing of said circuit breaker.

10. In an automatic reclosing circuit breaker system, a supply circuit, a plurality of separate load circuits, each load circuit being adapted to be supplied with current at a plurality of points, a circuit breaker for connecting corresponding conductors of said separate load circuits in parallel and to said supply circuit, means responsive to the current flowing between said supply and load circuits for effecting the opening of said circuit breaker, and means arranged to operate when the supply circuit voltage exceeds the average of the voltages across said load circuits for controlling the reclosing of said circuit breaker.

11. In an automatic reclosing circuit breaker system, a supply circuit, a plurality of separate load circuits, each load circuit being adapted to be supplied with current at a plurality of points, a circuit breaker for connecting said supply circuit to said separate load circuits, means for opening said circuit breaker, a separate current limiting device associated with each load circuit, means responsive to the opening of said circuit breaker for connecting said devices in series between the supply circuit and the respective load circuits, and means responsive to the direction of the current flowing between said supply circuit and said devices for controlling the reclosing of said circuit breaker.

12. In an automatic reclosing circuit breaker system, a supply circuit, a plurality of separate load circuits, each load circuit being adapted to be supplied with current at a plurality of points, a circuit breaker for connecting said supply circuit to said separate load circuits, means for opening said circuit breaker, a separate relatively high resistor associated with each load circuit, said resistors being arranged to be connected in series between said supply circuit and the respective load circuits when said circuit breaker is open, and power directional means connected between said supply circuit and said resistors and operative when the current therethrough is in a predetermined direction for effecting the reclosing of said circuit breaker.

13. In an automatic reclosing circuit breaker system, a supply circuit, a plurality of load circuits, a circuit breaker for connecting said circuits together, means responsive to a predetermined abnormal condition of said supply circuit for effecting the opening of said circuit breaker, automatic reclosing means responsive to the opening of said circuit breaker for reclosing said circuit breaker, means for rendering said abnormal condition responsive means inoperative to effect the opening of said circuit breaker, slow acting interrupting means associated with each load circuit for disconnecting the respective load circuit from the supply circuit when a sustained overcurrent flows through the respective load circuit, and means for automatically restoring the control of said circuit breaker to said abnormal condition responsive means after it has been removed therefrom for a certain length of time.

14. In an automatic reclosing circuit breaker system, a supply circuit, a plurality of load circuits, a circuit breaker for connecting said circuits together, means responsive to a predetermined abnormal condition of said supply circuit for effecting the opening of said circuit breaker, automatic reclosing means responsive to the opening of said circuit breaker for reclosing said circuit breaker, means for rendering said abnormal condition responsive means inoperative to effect the opening of said circuit breaker, interrupting means in each load circuit operative in response to a sustained overcurrent therein for effecting the disconnection of the respective load circuit from the supply circuit, and time delayed current responsive means in said supply circuit for effecting the opening of said circuit breaker.

15. In an automatic reclosing circuit breaker system, two electric circuits, a circuit breaker for connecting said circuits, current responsive means for effecting the operation of said circuit breaker a predetermined number of times, and additional means controlled in accordance with an electrical condition of one of said circuits for effecting the operation of said circuit breaker independently of said current responsive means after said current responsive means has effected the operation of said circuit breaker a predetermined number of times.

16. In an automatic reclosing circuit breaker system, two electric circuits, a circuit breaker for connecting said circuits, overload responsive means for effecting the operation of said circuit breaker, means for rendering said overload responsive means inoperative to effect the operation of said circuit breaker after the operation of said circuit breaker has been effected thereby a predetermined number of times, and means controlled in accordance with an electrical condition of one of said circuits for effecting the operation of said circuit breaker after said overload responsive means has been rendered inoperative.

17. In an automatic reclosing circuit breaker system, two electric circuits, a circuit breaker for connecting said circuits, means responsive to a predetermined condition of one of said circuits for effecting the opening of said circuit breaker, means for effecting the reclosing of said circuit breaker after it has been opened by said opening means, and means controlled by the operation of said circuit breaker for rendering said opening means inoperative to effect the opening of said circuit breaker when it is subsequently reclosed after having been opened a predetermined number of times by said opening means.

In witness whereof, I have hereunto set my hand this 10th day of August, 1926.

ARVID E. ANDERSON.